(12) United States Patent
Hirose et al.

(10) Patent No.: US 9,728,779 B2
(45) Date of Patent: Aug. 8, 2017

(54) NEGATIVE ELECTRODE FOR NON-AQUEOUS ELECTROLYTE SECONDARY BATTERY AND NON-AQUEOUS ELECTROLYTE SECONDARY BATTERY

(71) Applicant: SHIN-ETSU CHEMICAL CO., LTD., Tokyo (JP)

(72) Inventors: Takakazu Hirose, Annaka (JP); Hiromichi Kamo, Takasaki (JP); Hiroki Yoshikawa, Takasaki (JP); Reiko Sakai, Takasaki (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 209 days.

(21) Appl. No.: 14/632,157

(22) Filed: Feb. 26, 2015

(65) Prior Publication Data
US 2015/0287989 A1 Oct. 8, 2015

(30) Foreign Application Priority Data

Apr. 2, 2014 (JP) .................................. 2014-76211

(51) Int. Cl.
| | |
|---|---|
| *H01M 4/485* | (2010.01) |
| *H01M 10/052* | (2010.01) |
| *H01M 4/36* | (2006.01) |
| *H01M 4/48* | (2010.01) |
| *H01M 4/136* | (2010.01) |
| *H01M 4/58* | (2010.01) |
| *H01M 4/587* | (2010.01) |
| *H01M 4/62* | (2006.01) |
| *H01M 4/02* | (2006.01) |

(52) U.S. Cl.
CPC .......... *H01M 4/485* (2013.01); *H01M 4/136* (2013.01); *H01M 4/364* (2013.01); *H01M 4/366* (2013.01); *H01M 4/483* (2013.01); *H01M 4/587* (2013.01); *H01M 4/5825* (2013.01); *H01M 4/622* (2013.01); *H01M 10/052* (2013.01); *H01M 2004/021* (2013.01)

(58) Field of Classification Search
CPC ...... H01M 4/485; H01M 4/366; H01M 4/483; H01M 4/622; H01M 4/136; H01M 4/364; H01M 4/5825; H01M 4/587; H01M 10/052; H01M 2004/021
See application file for complete search history.

(56) References Cited

U.S. PATENT DOCUMENTS

| | | | |
|---|---|---|---|
| 5,395,711 A | 3/1995 | Tahara et al. | |
| 7,459,236 B2 | 12/2008 | Konishiike et al. | |
| 8,377,592 B2 | 2/2013 | Jeong et al. | |
| 2006/0099507 A1 | 5/2006 | Kogetsu et al. | |
| 2008/0176137 A1 | 7/2008 | Endo et al. | |
| 2009/0202911 A1 | 8/2009 | Fukuoka et al. | |
| 2011/0143195 A1* | 6/2011 | Ito ......................... | H01M 4/134 429/199 |
| 2011/0311875 A1* | 12/2011 | Lee ....................... | H01M 4/362 429/231.95 |
| 2013/0308249 A1* | 11/2013 | Tamachi ................ | H01G 11/52 361/504 |
| 2014/0011083 A1* | 1/2014 | Asako ................... | H01M 4/624 429/211 |
| 2015/0050554 A1* | 2/2015 | Fukumine ............. | H01M 4/622 429/217 |
| 2016/0254687 A1* | 9/2016 | Tanaka ................... | H02J 7/045 |

FOREIGN PATENT DOCUMENTS

| | | |
|---|---|---|
| JP | 2997741 B2 | 1/2000 |
| JP | 2001-185127 A | 7/2001 |
| JP | 2002-042806 A | 2/2002 |
| JP | 2006-114454 A | 4/2006 |
| JP | 2006-164954 A | 6/2006 |
| JP | 2007-234255 A | 9/2007 |
| JP | 2008-177346 A | 7/2008 |
| JP | 2008-251369 A | 10/2008 |
| JP | 2008-282819 A | 11/2008 |
| JP | 2009-070825 A | 4/2009 |
| JP | 2009-205950 A | 9/2009 |
| JP | 2009-212074 A | 9/2009 |
| JP | 2010-092830 A | 4/2010 |

* cited by examiner

*Primary Examiner* — Muhammad Siddiquee
(74) *Attorney, Agent, or Firm* — Oliff PLC (57) ABSTRACT

The present invention provides a negative electrode for a non-aqueous electrolyte secondary battery, the negative electrode comprising a negative electrode active material layer containing: negative electrode active materials including carbon active material and silicon active material composed of $SiO_x$ at least partially coated with lithium carbonate where $0.5 \leq x \leq 1.6$; and binders including carboxymethyl cellulose or metal salt thereof, polyacrylic acid or metal salt thereof, and styrene-butadiene rubber or polyvinylidene fluoride, and a non-aqueous electrolyte secondary battery including this negative electrode. The negative electrode can increase the battery capacity and improve the cycle performance and first charge and discharge efficiency.

14 Claims, 4 Drawing Sheets

NEGATIVE ELECTRODE FOR NON-AQUEOUS ELECTROLYTE SECONDARY BATTERY AND NON-AQUEOUS ELECTROLYTE SECONDARY BATTERY

BACKGROUND OF THE INVENTION

Field of the Invention

The present invention relates to a negative electrode for a non-aqueous electrolyte secondary battery and a non-aqueous electrolyte secondary battery.

Description of the Related Art

In Recent years, small electronic devices, represented by mobile terminals, have been widely used and urgently required to reduce the size and weight and to increase the life. Such requirement has advanced the development of particularly small, lightweight secondary batteries with higher energy density.

These secondary batteries are considered to find application not only for small electronic devices but for large electronic devices such as, typically, automobiles as well as power storage systems such as, typically, houses.

Among those, lithium-ion secondary batteries are easy to reduce the size and increase the capacity and have higher energy density than those of lead or nickel-cadmium batteries, receiving considerable attention.

The lithium-ion secondary battery has positive and negative electrodes, a separator, and an electrolyte. The negative electrode includes a negative electrode active material related to charging and discharging reactions.

A negative electrode active material, which is usually made of a carbon material, is required to further improve the battery capacity for recent market requirement.

Use of silicon as a negative electrode active material is considered to improve the battery capacity, for silicon has a logical capacity (4199 mAh/g) ten times larger than does graphite (372 mAh/g). Such a material is thus expected to significantly improve the battery capacity.

The development of silicon materials for use as negative electrode active materials includes not only silicon as a simple but also alloy thereof and a compound thereof such as typically oxides.

The consideration of active material shapes for carbon materials ranges from a standard application type to an integrated type in which the materials are directly accumulated on a current collector.

Use of silicon as a main material of a negative electrode active material, however, expands or shrinks the negative electrode active material when charging or discharging, thereby making the negative electrode active material easy to break particularly near its surface layer. In addition, this active material produces ionic substances in its interior and is thus easy to break.

The breakage of the surface layer of the negative electrode active material creates a new surface, increasing a reaction area of the active material. The new surface then causes the decomposition reaction of an electrolyte and is coated with a decomposition product of the electrolyte, thereby consuming the electrolyte. This makes the cycle performance easy to reduce.

Various materials and configurations of a negative electrode for a lithium-ion secondary battery mainly using a silicon material have been considered to improve the initial battery efficiency and the cycle performance.

More specifically, a vapor deposition method is used to accumulate silicon and amorphous silicon dioxide simultaneously so that better cycle performance and greater safety are achieved (See Patent Document 1, for example).

Moreover, a carbon material, an electronic conduction material, is disposed on the surface of silicon oxide particles so that a higher battery capacity and greater safety are achieved (See Patent Document 2, for example).

Moreover, an active material including silicon and oxygen is produced to form an active material layer having a higher ratio of oxygen near a current collector so that improved cycle performance and higher input-output performance are achieved (See Patent Document 3, for example).

Moreover, silicon active material is formed so as to contain oxygen with an average content of 40 at % or less and with a higher oxygen content near a current collector so that improved cycle performance is achieved (See Patent Document 4, for example).

Moreover, a nano-complex including Si-phase, $SiO_2$, $M_yO$ metal oxide is used to improve the first charge and discharge efficiency (See Patent Document 5, for example).

Moreover, $SiO_x$ ($0.8 \le x \le 1.5$) having a particle size ranging from 1 μm to 50 μm and a carbon material are mixed and calcined at a high temperature so that improved cycle performance is achieved (See Patent Document 6, for example).

Moreover, a mole ratio of oxygen to silicon in a negative electrode active material is adjusted in the range from 0.1 to 0.2 so as to hold a difference between the maximum and the minimum of the mole ratio near the interface between the active material and a current collector at 0.4 or less, so that improved cycle performance is achieved (See Patent Document 7, for example).

Moreover, a metal oxide containing lithium is used to improve the battery load characteristic (See Patent Document 8, for example).

Moreover, a hydrophobic layer such as a silane compound is formed in the surface layer of a silicon material so that improved cycle performance is achieved (See Patent Document 9, for example).

Moreover, a silicon oxide is used and coated with graphite to give conductivity so that improved cycle performance is achieved (See Patent Document 10, for example). Patent Document 10 describes that a shift value of the graphite coating, which is obtained from a RAMAN spectrum, has broad peaks at 1330 $cm^{-1}$ and 1580 $cm^{-1}$ and a ratio $I_{1330}/I_{1580}$ of its intensity shows $1.5 < I_{1330}/I_{1580} < 3$.

Moreover, a particle having an Si-microcrystal phase dispersing in a silicon dioxide is used to achieve a higher battery capacity and improved cycle performance (See Patent Document 11, for example).

Moreover, a silicon oxide having a silicon-to-oxygen atomicity ratio of 1:y ($0<y<2$) is used to improve overcharge and overdischarge performance (See Patent Document 12, for example).

Finally, a mixed electrode of silicon and carbon is produced so as to include the silicon at a ratio ranging from 5 weight % to 13 weight % (See Patent Document 13, for example).

CITATION LIST

Patent Literature

[Patent Document 1] Japanese Patent Application Publication No. 2001-185127

[Patent Document 2] Japanese Patent Application Publication No. 2002-042806

[Patent Document 3] Japanese Patent Application Publication No. 2006-164954
[Patent Document 4] Japanese Patent Application Publication No. 2006-114454
[Patent Document 5] Japanese Patent Application Publication No. 2009-070825
[Patent Document 6] Japanese Patent Application Publication No. 2008-282819
[Patent Document 7] Japanese Patent Application Publication No. 2008-251369
[Patent Document 8] Japanese Patent Application Publication No. 2008-177346
[Patent Document 9] Japanese Patent Application Publication No. 2007-234255
[Patent Document 10] Japanese Patent Application Publication No. 2009-212074
[Patent Document 11] Japanese Patent Application Publication No. 2009-205950
[Patent Document 12] Japanese Patent No. 2997741
[Patent Document 13] Japanese Patent Application Publication No. 2010-092830

SUMMARY OF THE INVENTION

As described previously, small electronic devices, represented by mobile terminals, have been developed to improve their performance and increase their functions. Lithium-ion secondary batteries, which are used as main sources of the devices, have been required to increase the battery capacity.

The development of lithium-ion secondary batteries including negative electrodes mainly using silicon materials have been desired to solve this problem.

The lithium-ion secondary batteries using silicon materials need the same cycle performance as lithium-ion secondary batteries using carbon materials.

For such batteries, however, no one has yet proposed a negative electrode exhibiting the same cycle stability as lithium-ion secondary batteries using carbon materials.

The present invention was accomplished in view of the above problems, and it is an object of the present invention to provide a negative electrode that can increase the battery capacity and improve the cycle performance and first charge and discharge efficiency as well as a non-aqueous electrolyte secondary battery including this negative electrode.

To achieve this object, the present invention provides a negative electrode for a non-aqueous electrolyte secondary battery, the negative electrode comprising a negative electrode active material layer containing: negative electrode active materials including carbon active material and silicon active material composed of $SiO_x$ at least partially coated with lithium carbonate where $0.5 \leq x \leq 1.6$; and binders including carboxymethyl cellulose or metal salt thereof, polyacrylic acid or metal salt thereof, and styrene-butadiene rubber or polyvinylidene fluoride.

The negative electrode for a non-aqueous electrolyte secondary battery, which includes the silicon active material and the carbon active material, allows discharging at a lower electric potential by the carbon active material, thereby enabling improvement in volume energy density of the battery. In addition, the lithium carbonate ($Li_2CO_3$) with which the silicon active material is coated can reduce irreversible components that are produced at charging, thereby enabling improvement in battery performances. Lithium carbonate, however, is partially soluble in water, thus alkalizing a slurry. The alkalized slurry reduces the peel strength of electrodes. Accordingly, carboxymethyl cellulose or metal salt thereof, and polyacrylic acid or metal salt thereof are added into a main binder of styrene-butadiene rubber or polyvinylidene fluoride; such a negative electrode active material can greatly inhibit reduction in the electrode peel strength, thereby enabling better battery performances. This is a better way of using the negative active material.

The mass ratio of the silicon active material to the total amount of the negative electrode active materials is preferably 6 mass % or more.

Such a negative electrode can greatly increase the battery capacity.

The silicon active material preferably contains at least one of $Li_2SiO_3$ and $Li_4SiO_4$ in an interior.

Such silicon active material can reduce an irreversible capacity that appears at charging, because an $SiO_2$ component, which becomes unstable at lithium insertion or extraction, in this silicon active material has been partially changed into a lithium compound. This allows a higher charge and discharge efficiency and improvement in bulk stability. This silicon active material can be obtained by the modification of silicon active material, for example, in an electrochemical manner.

It is preferable that $Li_2SiO_3$ contained in the silicon active material exhibits a diffraction peak having a half width ($2\theta$) of 0.75° or more, the diffraction peak being observed at around 38.2680° when X-ray diffraction is performed on the silicon active material.

The silicon active material containing $Li_2SiO_3$ with a low crystallinity can inhibit the degradation of battery performances.

It is preferable that $Li_4SiO_4$ contained in the silicon active material exhibits a diffraction peak having a half width ($2\theta$) of 0.2° or more, the diffraction peak being observed at around 23.9661° when X-ray diffraction is performed on the silicon active material.

The silicon active material containing $Li_4SiO_4$ with a low crystallinity can inhibit the degradation of battery performances.

It is preferable that $Li_2SiO_3$ and $Li_4SiO_4$ contained in the silicon active material are amorphous.

The amorphous lithium compound enables the degradation of battery performances to be reliably inhibited.

The mass ratio C/P preferably satisfies the following formula (1), $$5 \geq C/P \geq 0.25 \qquad (1)$$

where C is mass of the carboxymethyl cellulose or metal salt thereof and P is mass of the polyacrylic acid or metal salt thereof.

This ratio prevents the amount of the polyacrylic acid from becoming too large, thereby making the negative electrode active material layer easy to form with a thicker thickness; this ratio also prevents the amount of the polyacrylic acid from becoming too small, thereby preventing reduction in adhesion. In this case, the carboxymethyl cellulose and the polyacrylic acid may contain metal salt.

The amount of the negative electrode active material layer on one side is preferably equal to or less than 8.5 mg/cm$^2$ per unit area.

Such an amount makes the negative electrode active material layer hard to peel even when the layer is formed of negative electrode active materials containing a hard binder such as polyacrylic acid or metal salt thereof with a thicker thickness.

The negative electrode for a non-aqueous electrolyte secondary battery preferably includes a carbon nanotube (CNT).

The carbon nanotube is suitable to electrically contact the silicon active material, which has high expansion and shrinkage rates, with the carbon active material, thereby allowing the negative electrode to have better conductivity.

The carbon active material preferably contains natural graphite, and a mass ratio of the natural graphite to the total amount of the carbon active material ranges from 30 mass % to 80 mass %.

The natural graphite is suitable to reduce a stress due to expansion and shrinkage of the silicon active material, thereby enabling the inhibition of breakage of the negative electrode active materials and better cycle performance.

The carbon active material preferably contains at least two materials selected from the group consisting of natural graphite, synthetic graphite, hard carbon, and soft carbon.

The carbon active material containing at least two materials selected from these materials enables better battery performances.

The negative electrode preferably satisfies $X/Y \geq 1$ where X is a median diameter of the carbon active material and Y is a median diameter of the silicon active material.

This negative electrode, including the expandable and shrinkable silicon active material having a size equal to or less than that of the carbon active material, enables the layer using these materials to be prevented from breaking. The negative electrode, including the carbon active material having a larger size than that of the silicon active material, also enables improvement in negative-electrode volume density at charging, negative-electrode initial efficiency, and battery energy density.

The silicon active material preferably satisfies $A/B \geq 0.8$ where A is a peak intensity of an Si region represented by a chemical shift value of $-60$ ppm to $-100$ ppm, and B is a peak intensity of an $SiO_2$ region represented by a chemical shift value of $-100$ ppm to $-150$ ppm, the chemical shift value being obtained from a $^{29}Si$-Magic Angle Spinning (MAS)-Nuclear Magnetic Resonance (NMR) spectrum.

Use of the silicon active material having the above peak intensity ratio enables much better first charge and discharge efficiency.

The silicon active material preferably exhibits a diffraction peak having a half width $(2\theta)$ of $1.2°$ or more, the diffraction peak being attributable to an Si(111) crystal face and obtained when X-ray diffraction is performed on the silicon active material, and a crystallite size attributable to the crystal face is 7.5 nm or less.

Such silicon active material reduces Si-crystalline nuclei, thereby enabling the negative electrode to have better battery cycle performance.

Furthermore, the present invention provides a non-aqueous electrolyte secondary battery using any one of the above negative electrodes.

Such a non-aqueous electrolyte secondary battery has a high capacity, better cycle performance, and better first charge and discharge efficiency.

The inventive negative electrode for a non-aqueous electrolyte secondary battery includes silicon active material in which an $SiO_2$ component, which becomes unstable at lithium insertion or extraction, has been partially changed into a lithium compound, thereby enabling reduction in irreversible capacity, which appears at charging.

The mixture of the silicon active material and the carbon active material allows the negative electrode to have increased battery capacity. Generating lithium carbonates in the surface layer of the material at lithium insertion and extraction allows reduction in irreversible components, which are produced at charging of the battery.

The above materials can be stably used by using three binders: a main binder of styrene-butadiene rubber or polyvinylidene fluoride; an additive binder of carboxymethyl cellulose or metal salt thereof; and an additive binder of polyacrylic acid or metal salt thereof.

The inventive negative electrode and a non-aqueous electrolyte secondary battery using the negative electrode can improve the battery capacity, cycle performance, and first charge and discharge efficiency. In addition, electronic devices, machine tools, electric vehicles, and power storage systems, etc., using the inventive secondary battery can achieve the same effect.

DETAILED DESCRIPTION OF THE PREFERRED EMBODIMENTS

Hereinafter, embodiments of the present invention will be described, but the present invention is not restricted to these embodiments.

As described previously, use of a negative electrode mainly made of silicon materials for use in a lithium-ion secondary battery has been considered to increase the capacity of the lithium-ion secondary battery.

The lithium-ion secondary batteries using silicon materials are required to have the same cycle performance as lithium-ion secondary batteries using carbon materials; however, no one has yet proposed a negative electrode exhibiting the same cycle stability as lithium-ion secondary batteries using carbon materials.

In view of this, the present inventors diligently conducted study on a negative active material that allows the negative electrode for a lithium-ion secondary battery to have better cycle performance, bringing the present invention to completion.

The inventive negative electrode for a non-aqueous electrolyte secondary battery includes negative electrode active materials including carbon active material and silicon active material composed of $SiO_x$ at least partially coated with lithium carbonate where $0.5 \leq x \leq 1.6$; and binders to support the negative electrode active materials: a first binder of carboxymethyl cellulose or metal salt thereof, a second binder of polyacrylic acid or metal salt thereof, and a third binder of styrene-butadiene rubber or polyvinylidene fluoride.

Figure 1:
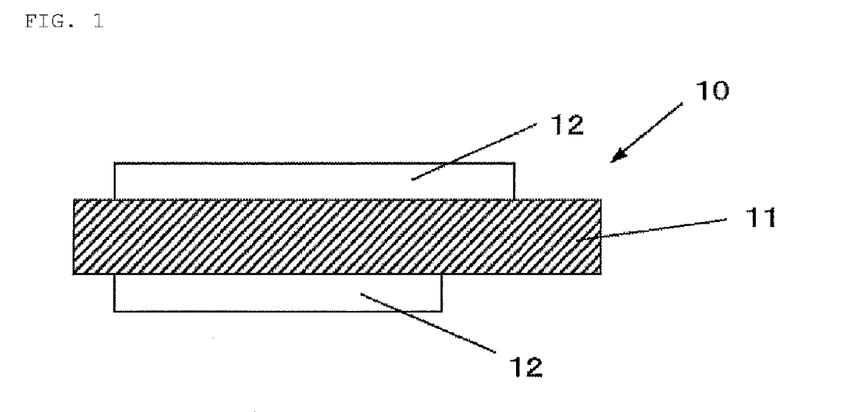
FIG. 1 is a cross-sectional view of a configuration of the inventive negative electrode for a non-aqueous electrolyte secondary battery.

The inventive negative electrode for a non-aqueous electrolyte secondary battery will now be described. FIG. 1 shows a cross-sectional configuration of a negative electrode for a non-aqueous electrolyte secondary battery, which will be also referred to simply as a negative electrode, according to one embodiment of the invention.

[Configuration of Negative Electrode]

As shown in FIG. 1, the negative electrode 10 has a negative electrode active material layer 12 on a negative-electrode current collector 11. The negative electrode active material layer 12 may be disposed on one side or both sides of the negative-electrode current collector 11. The negative-electrode current collector 11 is not necessarily needed in the inventive negative electrode for a non-aqueous electrolyte secondary battery.

[Negative-Electrode Current Collector]

The negative-electrode current collector 11 is made of a highly conductive and mechanically strong material. Examples of the conductive material used for the negative-electrode current collector 11 include copper (Cu) and nickel (Ni). Such conductive materials preferably have inability to form an intermetallic compound and lithium (Li).

The negative-electrode current collector 11 preferably contains carbon (C) and sulfur (S) other than a main element. The reason is as follows: these elements improve the physical strength of the current collector; the current collector including the above elements, particularly when the active material layer contains a material expandable at charging, can inhibit deformation of the electrodes and the current collector itself. The content of the above elements is preferably, but not particularly limited to, 100 ppm or less. This content enables the deformation to be effectively inhibited.

The surface of the negative-electrode current collector 11 may or may not be roughed. Examples of the negative-electrode current collector roughened include a metallic foil subjected to an electrolyzing process, an embossing process, or a chemical etching process. Examples of the negative-electrode current collector that is not roughened include a rolled metallic foil.

[Negative Electrode Active Material Layer]

The negative electrode active material layer 12 contains particulate negative electrode active materials (also referred to as negative electrode active material particles below) that can occlude and emit lithium ions and binders (negative-electrode binders) and may further contain other materials such as a conductive additive depending on battery design.

The negative electrode active materials used for the inventive negative electrode include silicon active material and carbon active material. The silicon active material includes a lithium compound in a portion such as the surface or interior of a silicon compound that can occlude and emit lithium ions, and has a coating layer composed of lithium carbonate ($Li_2CO_3$) on the surface of the silicon compound.

The silicon active material may also include a conductive carbon coating layer and a lithium carbonate coating layer on the surface of the carbon coating layer.

In other words, particles of the silicon active material may include a core that can occlude and emit lithium ions, a conductive carbon coating at the surface layer of the core, and a lithium carbonate portion that can inhibit decomposition reaction of an electrolyte. The carbon coating may then occlude and emit lithium ions from a portion or the entire thereof. The carbon coating and lithium carbonate portion may have an island shape or a film shape; both shapes exert the same effect as above.

The silicon active material used for the inventive negative electrode is a silicon oxide ($SiO_x$, where $0.5 \leq x \leq 1.6$); a preferable composition thereof is that x is close to 1. The reason is that this composition enables high cycle performance. The present invention does not necessarily intend a silicon material composition of 100% but permits a silicon material containing a minute amount of impurities.

The inventive negative electrode preferably includes silicon active material containing at least one of $Li_2SiO_3$ and $Li_4SiO_4$ in the interior of a particle thereof.

Such a negative electrode enables more stable battery performances.

As described previously, coating this silicon active material with carbon or lithium carbonate allows further stable battery performances.

Such silicon active material particles can be obtained by selectively changing a part of $SiO_2$ components, which are created in their interior, into lithium compounds. In particular, $Li_4SiO_4$ and $Li_2SiO_3$ exhibit excellent characteristics. These selective compounds can be produced by regulating electric potential and current toward a lithium counter electrode and changing conditions.

The amount of lithium compounds can be measured by NMR or X-ray photoelectron spectroscopy (XPS). The measurement by NMR or XPS can be performed under, for example, the following conditions:

XPS
  Apparatus: an X-ray photoelectron spectroscopy apparatus
  X-ray Source: a monochromatic Al—Kα ray
  X-ray Spot Diameter: 100 μm
  Ar-ion Sputtering Gun Conditions: 0.5 kV, 2 mm×2 mm
  $^{29}$Si-MAS-NMR
  Apparatus: a 700-NMR spectroscope made by Bruker Corp.
  Probe: a 4-mm-HR-MAS rotor, 50 μL
  Sample Rotation Speed: 10 kHz
  Temperature of Measurement Environment: 25° C.

The procedure for producing the selective compound, the modification of the silicon active material, is preferably performed in an electrochemical manner.

Production of negative electrode active material particles by this type of modification (bulk modification) allows an Si region to be inhibited or prevented from becoming a lithium compound, thereby making the particles stable in air, water slurry, or solvent slurry. The electrochemical manner allows heat modification (heat doping) to produce more stable substances, although the heat modification tend to produce a compound randomly.

The silicon active material including $Li_4SiO_4$ or $Li_2SiO_3$ produced in the interior of its bulk improves the performances; coexistence of both the compounds in the bulk further improves the performances.

The silicon active material including $Li_2CO_3$ at its outermost surface, according to the invention, significantly improves preservation performance of powder thereof. The best procedure of forming $Li_2CO_3$ is, but not limited to, an electrochemical manner.

In particular, $Li_2SiO_3$ contained in the silicon active material preferably exhibits a diffraction peak having a half width (2θ) of 0.75° or more that is observed at around 38.2680° when X-ray diffraction is performed on the silicon active material. In addition, $Li_4SiO_4$ contained in the silicon active material preferably exhibits a diffraction peak having a half width (2θ) of 0.2° or more that is observed at around 23.9661° when X-ray diffraction is performed on the silicon active material. More preferably, $Li_2SiO_3$ and $Li_4SiO_4$ are amorphous.

The increasingly lower crystallinity of these lithium compounds contained in the silicon active material further reduces the resistance in the negative electrode and suppresses the degradation of battery performances. The substantial amorphousness of these compounds more reliably suppresses the degradation of battery performances.

The negative electrode active materials in the inventive negative electrode for a non-aqueous electrolyte secondary battery are made of the mixture of the silicon active material and the carbon active material. The carbon material, which can discharge at a lower electric potential, contributes improvement in the volume energy density of batteries.

The carbon active material contained in the negative electrode preferably contains natural graphite as a main material. More specifically, the mass ratio of the natural graphite to the total amount of the carbon active material preferably ranges from 30 mass % to 80 mass %.

The natural graphite is suitable to reduce the stress due to expansion and shrinkage of the silicon active material; the above ratio makes the negative electrode excellent in cycle performance.

The carbon active material preferably contains synthetic graphite to achieve more excellent cycle performance. The synthetic graphite, which is harder than natural graphite, is unsuitable to reduce the stress due to expansion and shrinkage of the silicon active material and preferably added at a rate ranging from 10% to 120% with respect to the natural graphite accordingly.

The carbon active material contained in the negative electrode preferably contains at least two materials selected from the group consisting of natural graphite, synthetic graphite, hard carbon, and soft carbon.

The carbon active material containing the above two materials enables the negative electrode active materials to reduce the stress and to provide excellent battery capacity.

In the present invention, the mass ratio of the silicon active material to the total amount of the negative electrode active materials is 6 mass % or more.

The above ratio enables an increase in battery volume energy density.

A lower crystallinity of the silicon active material contained in the inventive negative electrode is better. More specifically, the silicon active material preferably exhibits a diffraction peak having a half width (2θ) of 1.2° or more that is attributable to an Si(111) crystal face and obtained when X-ray diffraction is performed on the silicon active material, and a crystallite size of 7.5 nm or less that is attributable to the crystal face.

The silicon active material particularly having a lower crystallinity and a fewer Si crystal can improve battery performances and produce stable lithium compounds.

The median diameter of the silicon active material is preferably in the range from 0.5 μm to 20 μm, but not particularly limited thereto. This range makes it easy to occlude and emit lithium ions and inhibits the breakage of the particles at charging and discharging. A median diameter of 0.5 μm or more then prevents the silicon active material surface from becoming too large and can thus reduce the battery irreversible capacity; a median diameter of 20 μm or less preferably inhibits the breakage of the particles and the creation of a new surface.

The median diameter of the silicon active material preferably satisfies X/Y≥1 where X is the median diameter of the carbon active material and Y is the median diameter of the silicon active material.

In this way, the carbon active material in the negative electrode active material layer preferably has a size equal to or more than that of the silicon active material. The negative electrode, including the expandable and shrinkable silicon active material having a size equal to or less than that of the carbon active material, enables the layer using these materials to be prevented from breaking. The negative electrode, including the carbon active material having a larger size than that of the silicon active material, also enables improvement in negative electrode volume density at charging, negative electrode initial efficiency, and battery energy density.

The silicon active material in the negative electrode active materials preferably satisfies A/B≥0.8 where A is the peak intensity of an Si region represented by a chemical shift value of −60 ppm to −100 ppm, and B is the peak intensity of an $SiO_2$ region represented by a chemical shift value of −100 ppm to −150 ppm; the chemical shift value is obtained from a $^{29}$Si-MAS-NMR spectrum.

This type of silicon active material enables stable battery performances.

If the silicon active material is coated with carbon, the average thickness of the carbon coating is preferably in the range from 1 nm to 5000 nm, but not limited thereto.

Such a thickness enables improvement in conductivity. The average thickness of the carbon coating in excess of 5000 nm reduces the battery capacity, although this thickness does not degrade the battery performances. The average thickness is thus preferably 5000 nm or less.

The average thickness of the carbon coating is calculated by the following procedure. The negative electrode active materials are first observed with a transmission electron microscope (TEM) under a predetermined magnification. This magnification is preferably a value allowing visual observation of the thickness. The thickness of the carbon coating is then measured at 15 points. In this measurement, the measurement points are preferably selected widely and randomly without focusing the measurement points on a specific location. The average is finally calculated from the measurement result.

The coverage of carbon on the surface of the silicon active material is preferably as high as possible, but not limited in particular; a coverage of 30% or more enables sufficient conductivity.

The method of coating carbon is preferably, but not particularly limited to, sugar carbonization or pyrolysis of hydrocarbon gas, for these methods allows improvement in carbon coverage.

The inventive negative electrode for a non-aqueous electrolyte secondary battery contains binders (negative-electrode binders) including carboxymethyl cellulose or metal salt thereof, polyacrylic acid or metal salt thereof, and styrene-butadiene rubber or polyvinylidene fluoride. The carboxymethyl cellulose, for example, may be partially replaced into sodium salt. Preferred examples of the metal salt of polyacrylic acid include polyacrylic acid lithium and polyacrylic acid sodium.

The mass ratio C/P preferably satisfies the following formula (1), $$5 \geq C/P \geq 0.25 \qquad (1)$$

where C is mass of the carboxymethyl cellulose or metal salt thereof and P is mass of the polyacrylic acid or metal salt thereof.

This ratio prevents the amount of the polyacrylic acid from becoming too large, thereby making the negative electrode active material layer easy to form with a thicker thickness; this ratio also prevents the amount of the polyacrylic acid from becoming too small, thereby preventing reduction in adhesion. In this case, the carboxymethyl cellulose and the polyacrylic acid may contain metal salt. In particular, the polyacrylic acid achieves sufficient effects.

An example of the negative-electrode conductive additive is a carbon material selected from the group consisting of carbon black, acetylene black, graphite, ketjen black, carbon nanotube (CNT), carbon nanofiber, or the combination thereof.

In particular, the carbon nanotube is suitable to electrically contact silicon material, which has high expansion and shrinkage rates, with carbon material.

The negative electrode active material layer is formed by, for example, an application method. The application method is to mix the negative electrode active material particles and the binders, in addition to the conductive additive and the carbon material as needed, and disperse the resultant mixture into an organic solvent or water to apply the resultant to a subject.

The negative electrode for a non-aqueous electrolyte secondary battery is preferably configured such that the amount of the negative electrode active material layer on one side is equal to or less than 8.5 mg/cm$^2$ per unit area.

Such an amount makes the negative electrode active material layer hard to peel even when the layer is formed of negative electrode active materials containing a hard binder such as polyacrylic acid or metal salt thereof with a thicker thickness.

[Method of Producing Negative Electrode]

A method of producing negative electrode active material particles contained in the inventive negative electrode for a non-aqueous electrolyte secondary battery will now be described. Firstly, silicon active material represented by $SiO_x$ (0.5≤x≤1.6) is produced. Lithium is then inserted into the silicon active material to modify the silicon active material such that lithium compounds are created on the silicon active material surface. In the modification, lithium compounds may be created in the interior of the silicon active material, in addition to the surface.

More specific procedures for producing the negative electrode active material particles will be described below by way of example.

A raw material capable of generating a silicon oxide gas is first heated under an inert gas atmosphere or a reduced pressure at a temperature ranging from 900° C. to 1600° C. to produce the silicon oxide gas. The raw material is a mixture of metallic silicon powder and silicon dioxide powder. The mole ratio of the mixture preferably satisfies the relation of 0.8<metallic silicon powder/silicon dioxide powder<1.3, in consideration of the existence of oxygen on the metallic silicon powder surface and a minute amount of oxygen in a reactor. The Si-crystallites in the particles are controlled by adjustment of an arrangement range and a vaporization temperature, or heat treatment after the production. The produced gas is deposited on an absorption plate. The temperature in the reactor is decreased to 100° C. or less and then a deposit is taken out. The deposit is pulverized with a ball mill or a jet mill to form powder.

The obtained powder may be then coated with a carbon layer. This step is effective to further improve battery performances, but unessential.

Thermal chemical vapor deposition (CVD) is preferable to coat the obtained powder with the carbon layer. The thermal CVD is to fill a furnace in which the silicon oxide powder is placed with a hydrocarbon gas and heat the interior of the furnace. The pyrolysis temperature is preferably, but not particularly limited to, 1200° C. or less, more preferably 950° C. or less, for the disproportionation of the active material particles can be inhibited. The hydrocarbon gas preferably has a composition of CnHm where 3≥n, but is not particularly limited thereto. This composition enables reduction in production cost and improvement in physical properties of a pyrolysis product.

It is desirable for the bulk modification to be able to insert or extract lithium in an electrochemical manner. The bulk modification can be performed with, for example, a bulk modification apparatus 20 shown in FIG. 2, but the configuration of the apparatus is not particularly limited. The bulk modification apparatus 20 has a bath 27 filled with an organic solvent 23, a positive terminal 21 (a lithium source or a modification source) that is disposed in the bath 27 and connected to one terminal of a power source 26, a powder container 25 that is disposed in the bath 27 and connected to the other terminal of the power source 26, and a separator 24 disposed between the positive terminal 21 and the powder container 25. The powder container 25 contains silicon oxide power 22.

Figure 2:
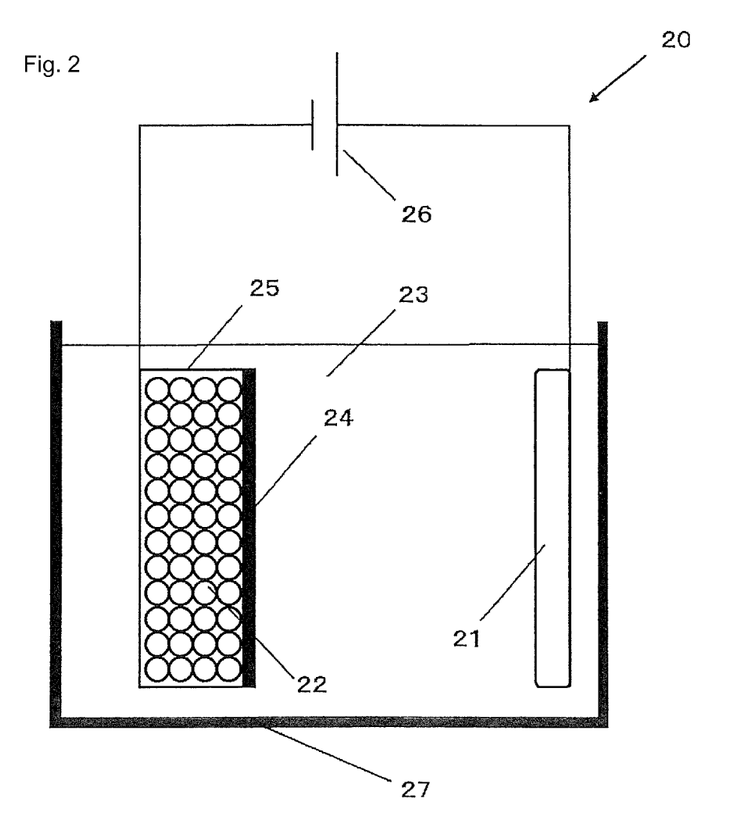
FIG. 2 is a diagram of a bulk modification apparatus that is used in production of negative electrode active materials to be contained in the inventive negative electrode for a non-aqueous electrolyte secondary battery.

The silicon oxide power 22 may be coated with $Li_2SiO_3$ simultaneously with the modification.

The modified particles thus obtained does not necessarily include the carbon coating. If the bulk modification needs more uniform control to reduce potential distribution, however, the carbon coating is desirable.

Examples of the organic solvent 23 in the bath 27 include ethylene carbonate, propylene carbonate, dimethyl carbonate, diethyl carbonate, ethylmethyl carbonate, carbonic acid fluoromethylmethyl ester, and carbonic acid methyl(difluoromethyl) ester. Examples of electrolyte salt contained in the organic solvent 23 include lithium hexafluorophosphate ($LiPF_6$), and lithium tetrafluoroborate ($LiBF_4$).

The positive terminal 21 may be made of a lithium foil or a lithium-containing compound. Examples of the lithium-containing compound include lithium carbonate, lithium oxide, lithium cobalt oxide, olivine iron lithium, lithium nickel oxide, and lithium vanadium phosphate.

Secondary, the above particles of silicon active material and carbon active material are mixed, and these negative electrode active material particles are mixed with the binders (negative-electrode binders) and other materials such as conductive additive to form a negative-electrode mixture. This mixture is added to an organic solvent, water, or other liquid to form slurry.

The present invention uses binders including three materials in which carboxymethyl cellulose or metal salt thereof, and polyacrylic acid or metal salt thereof are added to styrene-butadiene rubber or polyvinylidene fluoride.

For a conventional negative electrode, silicon active material including lithium carbonate on a surface thereof causes slurry of a negative-electrode mixture to alkalize, because lithium carbonate is partially soluble in water. The peel strength of this negative electrode consequently decreases.

In view of this problem, the present invention uses the above binders in which carboxymethyl cellulose or metal salt thereof, and polyacrylic acid or metal salt thereof are added to styrene-butadiene rubber or polyvinylidene fluoride. These binders can greatly inhibit the reduction in the negative-electrode peel strength due to the alkalization of the slurry, thereby enabling better battery performances.

Finally, the slurry of the negative-electrode mixture is applied to a surface of the negative-electrode current collector 11 and dried to form the negative electrode active material layer 12 as shown in FIG. 1. In this formation, hot press may be performed as necessary.

In this manner, the inventive negative electrode can be produced.

Such a negative electrode can greatly inhibit the reduction in its peel strength due to the alkalization of the slurry of the negative-electrode mixture, which is caused by lithium carbonate serving as a protection layer for the silicon active material surface, thereby enabling better battery performances.

<Lithium-Ion Secondary Battery>

A lithium-ion secondary battery will now be described as an exemplary non-aqueous electrolyte secondary battery using the above inventive negative material.

[Configuration of Laminate Film Secondary Battery]

Figure 3:
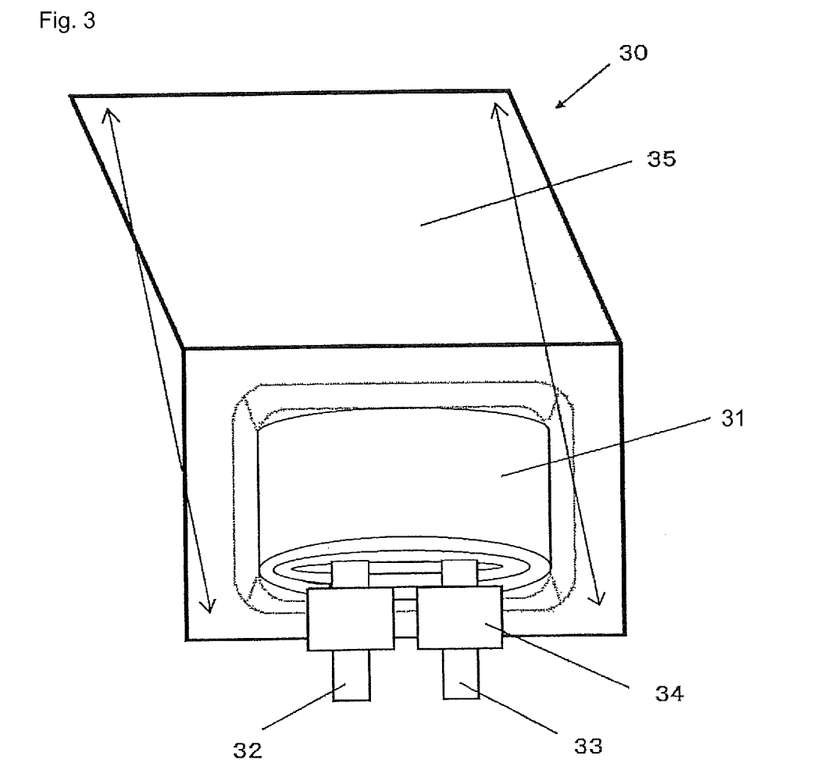
FIG. 3 is a diagram of an exemplary configuration (laminate film type) of a lithium-ion secondary battery using the inventive negative electrode.

The laminate film secondary battery 30 shown in FIG. 3 includes a wound electrode body 31 interposed between sheet-shaped outer parts 35. The wound electrode body 31 are formed by winding a positive electrode, a negative electrode, and a separator disposed between these electrodes. The electrode body may also be composed of a laminated part of the positive and negative electrodes, and a separator disposed between these electrodes. The electrode bodies of both types have a positive-electrode lead 32 attached to the positive electrode and a negative-electrode lead 33 attached to the negative electrode. The outermost circumference of the electrode bodies is protected by a protecting tape.

The positive-electrode lead 32 and the negative-electrode lead 33, for example, extends from the interior of the outer parts 35 toward the exterior in one direction. The positive-electrode lead 32 is made of, for example, a conductive material such as aluminum; the negative-electrode lead 33 is made of, for example, a conductive material such as nickel or copper.

An example of the outer part 35 is a laminate film composed of a fusion-bond layer, a metallic layer, and a surface protecting layer stacked in this order. Two laminate films are fusion-bonded or stuck with an adhesive at the outer edge of their fusion-bond layers such that each fusion-bond layer faces the electrode body 31. The fusion-bond layer may be, for example, a film such as a polyethylene or polypropylene film; the metallic layer aluminum foil; the protecting layer nylon.

The space between the outer parts 35 and the positive and negative electrodes is filled with close adhesion films 34 to prevent air from entering therein. Exemplary materials of the close adhesion films include polyethylene, polypropylene, and polyolefin.

[Positive Electrode]

The positive electrode has a positive electrode active material layer disposed on one side or both sides of a positive-electrode current collector as in the negative electrode 10, for examples, shown in FIG. 1.

The positive-electrode current collector is made of, for example, a conductive material such as aluminum.

The positive electrode active material layer contains a material that can occlude and emit lithium ions or the combination thereof, and may contain a positive-electrode binder, a positive-electrode conductive additive, a dispersing agent, or other materials according to design. The same detailed description as described for the negative-electrode binders and negative-electrode conductive additive, for example, is then given for the positive-electrode binder and the positive-electrode conductive additive.

The material of the positive electrode is preferably a compound containing lithium. Examples of this compound include a complex oxide composed of lithium and transition metal elements, and a phosphoric acid compound composed of lithium and transition metal elements. Among them, a compound including at least one of nickel, iron, manganese, and cobalt is preferable for the material of the positive electrode. The chemical formula of this compound is expressed by, for example, $Li_xM_1O_2$ or $Li_yM_2PO_4$, where $M_1$ and $M_2$ represent at least one kind of transition metal elements, and x and y represent a value varied depending on a charging or discharging status of a battery, which typically satisfy $0.05 \leq x \leq 1.10$ and $0.05 \leq y \leq 1.10$.

Examples of the complex oxide composed of lithium and transition metal elements include a lithium cobalt complex oxide ($Li_xCoO_2$), a lithium nickel complex oxide ($Li_xNiO_2$), a lithium nickel cobalt complex oxide. Example of the lithium nickel cobalt complex oxide include a lithium nickel cobalt aluminum complex oxide (NCA), a lithium nickel cobalt manganese complex oxide (NCM).

Examples of the phosphoric acid compound composed of lithium and transition metal elements include a lithium iron phosphoric acid compound ($LiFePO_4$), a lithium iron manganese phosphoric acid compound ($LiFe_{1-u}Mn_uPO_4$ ($0<u<1$)). Use of these positive electrode materials enables a higher battery capacity and excellent cycle performance.

[Negative Electrode]

The negative electrode is configured as in the above negative electrode 10 for a lithium-ion secondary battery shown in FIG. 1, and has the negative electrode active material layer, for example, on both faces of the current collector. The negative electrode preferably has a negative-electrode charge capacity larger than a battery charge capacity (electrical capacitance) provided by the positive electrode active material. This negative electrode itself can inhibit the precipitation of lithium metal.

The positive electrode active material layer is formed partially on both faces of the positive-electrode current collector. The same is true of the negative electrode active material layer. Such a negative electrode may have, for example, an area at which the positive electrode active material layer is not present on the surface of the positive-electrode current collector that the negative electrode active material layer faces. This area permits stable battery design.

The above area, at which the positive and negative electrode active material layers do not face one another, is hardly affected by charging and discharging. The status of the negative electrode active material layer is consequently maintained since its formation. This enables repeatable investigation of the composition of negative electrode active material with high precision without being affected by charging and discharging.

[Separator]

The separator separates the positive electrode and the negative electrode, prevents short circuit current due to contact of these electrodes, and passes lithium ions therethrough. This separator may be made of, for example, a porous film of synthetic resin or ceramics, or two or more stacked porous films. Examples of the synthetic resin include polytetrafluoroethylene, polypropylene, and polyethylene.

[Electrolyte]

A part of the active material layers or the separator is impregnated with a liquid electrolyte (an electrolyte solution). The electrolyte is composed of electrolyte salt dissolved in a solvent and may contain other materials such as additives.

The solvent may be, for example, a non-aqueous solvent. Examples of the non-aqueous solvent include ethylene carbonate, propylene carbonate, butylene carbonate, dimethyl carbonate, diethyl carbonate, ethylmethyl carbonate, carbonic acid propylmethyl ester, 1,2-Dimethoxyethane, and tetrahydrofuran. Among these, ethylene carbonate, propylene carbonate, dimethyl carbonate, diethyl carbonate, or ethylmethyl carbonate, or the combination thereof is particularly preferable. Such solvent enables better performances. The combination of a viscous solvent, such as ethylene carbonate or propylene carbonate, and a non-viscous solvent, such as dimethyl carbonate, diethyl carbonate or ethylmethyl carbonate allows much better performances, for such a solvent improves the dissociation of electrolyte salt and ionic mobility.

For an alloyed electrode, the solvent preferably contains a halogenated chain carbonic acid ester, or a halogenated cyclic carbonic acid ester. Such a solvent enables the negative electrode active material to be coated with a stable coating at discharging and particularly charging. The halogenated chain carbonic acid ester is a chain carbonic acid ester including halogen, in which at least one hydrogen atom is replaced by a halogen atom. The halogenated cyclic carbonic acid ester is a cyclic carbonic acid ester including halogen, in which at least one hydrogen atom is replaced by a halogen atom.

The halogen is preferably, but not limited to, fluorine, for fluorine enables the formation of better coating than other halogens do. A larger number of halogens is better, for a more stable coating can be obtained which reduces a decomposition reaction of an electrolyte.

Examples of the halogenated chain carbonic acid ester include carbonic acid fluoromethylmethyl ester, and carbonic acid methyl(difluoromethyl) ester. Examples of the halogenated cyclic carbonic acid ester include 4-fluoro-1,3-dioxolan-2-one or 4,5-difluoro-1,3-dioxolane-2-one.

The solvent preferably contains an unsaturated carbon bond cyclic carbonate as an additives, for this enables the formation of a stable coating on an electrode at charging and discharging and the inhibition of a decomposition reaction of an electrolyte. Examples of the unsaturated carbon bond cyclic carbonate include vinylene carbonate and vinyl ethylene carbonate.

In addition, the solvent preferably contains sultone (cyclic sulfonic acid ester) as an additives, for this enables improvement in chemical stability of a battery. Examples of the sultone include propane sultone and propene sultone.

In addition, the solvent preferably contains acid anhydride, for this enables improvement in chemical stability of a battery. The acid anhydride may be, for example, propane disulfonic acid anhydride.

The electrolyte salt may contain, for example, at least one light metal salt such as lithium salt. Examples of the lithium salt include lithium hexafluorophosphate ($LiPF_6$), and lithium tetrafluoroborate ($LiBF_4$).

The content of the electrolyte salt is preferably in the range from 0.5 mol/kg to 2.5 mol/kg. This content enables high ionic conductivity.

[Manufacture of Laminate Film Secondary Battery]

Firstly, a positive electrode is produced with the above positive-electrode material as follows. A positive-electrode mixture is created by mixing the positive-electrode material with as necessary the positive-electrode binder, the positive-electrode conductive additive, and other materials, and dispersed in an organic solvent to form slurry of the positive-electrode mixture. This slurry is then applied to a positive-electrode current collector with a coating apparatus such as a die coater having a knife roll or a die head, and dried by hot air to obtain a positive electrode active material layer. The positive electrode active material layer is finally compressed with, for example, a roll press. The compression may be performed under heating and/or repeated many times.

Secondly, a negative electrode active material layer is formed on a negative-electrode current collector to produce a negative electrode through the same procedure as in the above production of the negative electrode 10 for a lithium-ion secondary battery.

When the positive and negative electrodes are produced, the active material layers are formed on both faces of the positive- and negative-electrode current collector. In both the electrodes, the length of these active material layers formed on the faces may differ from one another (See FIG. 1).

Finally, the following steps are carried out in the order described. An electrolyte is adjusted. With ultrasonic welding, the positive-electrode lead 32 is attached to the positive-electrode current collector and the negative-electrode lead 33 is attached to the negative-electrode current collector. The positive and negative electrodes and the separator interposed therebetween are stacked or wound to produce the electrode body 31 and a protecting tape is stuck to the outermost circumference of the body. The electrode body is flattened. The film-shaped outer part 35 is folded in half to interpose the electrode body therebetween. The outer edge of the half parts is stuck to one another by heat sealing such that one of the four sides is opened to enter the electrode body therefrom. The close adhesion films are inserted between the outer part and the positive- and negative-electrode leads. The above adjusted electrolyte is introduced from the open side in a prescribed amount to perform the impregnation of the electrolyte under a vacuum. The open side is stuck by vacuum heat sealing.

In this manner, the laminate film secondary battery 30 can be produced.

The inventive non-aqueous electrolyte secondary battery, such as the laminate film secondary battery 30, preferably has a negative-electrode utilization factor of 93% to 99% at charging and discharging.

The secondary battery having a negative-electrode utilization factor of 93% or more prevents reduction in the first charge and discharge efficiency and greatly improves the battery capacity; one having a negative-electrode utilization factor of 99% or less prevents the precipitation of lithium, thereby ensuring safety.

EXAMPLES

The present invention will be more specifically described below with reference to examples and Comparative examples, but is not restricted to these examples.

Example 1-1

The laminate film secondary battery 30 shown in FIG. 3 was produced by the following procedure.

The procedure began with the production of a positive electrode. Positive electrode active materials of 95 mass parts of lithium cobalt oxide ($LiCoO_2$), 2.5 mass parts of positive-electrode conductive additive, and 2.5 mass parts of positive-electrode binders (polyvinylidene fluoride, PVDF) were mixed to produce a positive-electrode mixture. The positive-electrode mixture was dispersed in an organic solvent (N-methyl-2-pyrrolidone, NMP) to form paste slurry. The slurry was applied to both surfaces of a positive-electrode current collector with a coating apparatus having a die head and dried with a drying apparatus of hot-air type. The positive-electrode current collector had a thickness of 15 μm. The resultant was finally compressed with a roll press.

Next a negative electrode was produced. A silicon active material was produced in the following procedure. A mixed raw material of metallic silicon and silicon dioxide was placed in a reactor and vaporized under a vacuum of 10 Pa to accumulate the gas on an absorption plate. The accumulation was sufficiently cooled and then taken out to pulverize the accumulation with a ball mill. After adjustment of the particle diameter, the thermal CVD was performed to form a carbon coating. The produced powder was bulk-modified by the electrochemical method in a mixed solvent having an ethylene-carbonate-to-dimethyl-carbonate volume ratio of 3:7, including 1.3 mol/kg of electrolyte salt.

The produced silicon active material was mixed with natural graphite as carbon active material at a weight ratio of 10:90 to produce the negative electrode active material. Incidentally, synthetic graphite, hard carbon, and soft carbon may be added to the mixture as necessary.

The produced the negative electrode active material, a first conductive additive (carbon nanotube, CNT), a second conductive additive, styrene-butadiene rubber (styrene-butadiene copolymer, referred to as SBR below), carboxymethyl cellulose (referred to as CMC below), and polyacrylic acid (referred to as PAA below) were mixed at a dry weight ratio of 90.5 to 92.5:1:1:2.5:0.5 to 5:0 to 5. The mixture was diluted with pure wafer to form slurry of a negative-electrode mixture. The SBR, CMC, and PAA were negative-electrode binders.

An electrolytic copper foil, having a thickness of 15 μm, was used as a negative-electrode current collector. The negative-electrode mixture slurry was finally applied to the negative-electrode current collector and dried under a vacuum at 100° C. for 1 hour. The amount of the dried negative electrode active material layer of the negative electrode was 5 mg/cm$^2$ per unit area on one side. This amount is also referred to as an area density below, or simply density in tables below.

The polyacrylic acid used in examples preferably had a molecular weight of 2.5 hundred thousand to 12.5 hundred thousand, more preferably one million (for example, a product made by Wako Pure Chemical Industries, Ltd.) The present invention is not particularly limited thereto.

A solvent (4-fluoro-1,3-dioxolan-2-one, FEC), ethylene carbonate (EC), diethyl carbonate (DMC) were mixed and an electrolyte salt (lithium hexafluorophosphate, LiPF$_6$) was dissolved therein to produce an electrolyte. The composite of the solvent was FEC:EC:DMC=10:20:70. The content of the electrolyte salt in the solvent was 1.2 mol/kg.

The secondary battery was assembled by the following procedure. An aluminum lead was first ultrasonic-welded to one end of the positive-electrode current collector. A nickel lead was welded to one end of the negative-electrode current collector. The positive electrode, a separator, the negative electrode, a separator were then stacked in this order and wound in a longitudinal direction to obtain a wound electrode body. The end of the wounded part was fixed by a PET protecting tape. The separators were a 12-μm laminate film composed of a porous polyethylene film interposed between porous polypropylene films. The electrode body was interposed between outer parts and the outer circumferences except one side were heat-sealed to house the electrode body therein. The outer parts were an aluminum laminate film composed of a nylon film, aluminum foil, and a polypropylene film stacked. The adjusted electrolyte was poured from an open side to perform the impregnation of the electrolyte under a vacuum. The open side was stuck by heat sealing.

Examples 1-2 and 1-3, and Comparative Examples 1-1 and 1-2

A secondary battery was produced as in example 1-1 except that the amount of oxygen in the bulk of the silicon active material was adjusted in the production of the negative electrode material. Specifically, the amount of the accumulated oxygen was adjusted by varying the ratio and temperature of a material to be vaporized. Table 1 shows the value x of the silicon active materials expressed by SiO$_x$ in examples 1-1 to 1-3 and comparative examples 1-1 and 1-2.

The silicon active materials in examples 1-1 to 1-3 and comparative examples 1-1 and 1-2 had the following physical properties: The median diameter Y of the silicon active materials was 4 The half width (2θ) of the diffraction peak attributable to an Si(111) crystal face and obtainable by X-ray diffraction was 2.593°. The crystallite size attributable to the crystal face was 3.29 nm. The silicon active materials contained lithium carbonate (Li$_2$CO$_3$) and a carbon (C) coating in the surface layer and Li$_2$SiO$_3$ and Li$_4$SiO$_4$ in the interior; Li$_2$SiO$_3$ and Li$_4$SiO$_4$ were amorphous.

The silicon active materials satisfied A/B=2 where A was the peak intensity of an Si region represented by a chemical shift value of −60 ppm to −100 ppm, B was the peak intensity of an SiO$_2$ region represented by a chemical shift value of −100 ppm to −150 ppm, and the chemical shift value was obtained from a $^{29}$Si-MAS-NMR spectrum.

The carbon active materials had the following physical properties: The median diameter X of the carbon active materials was 20 μm. The ratio of the median diameter X of the carbon active material to the median diameter Y of the silicon active material was 5 accordingly.

The mass ratio C/P was 3 where C was the mass of the carboxymethyl cellulose (CMC) and P was the mass of the polyacrylic acid (PAA).

The amount (the area density) of the negative electrode active material layer of the negative electrode was 5 mg/cm$^2$ per unit area on one side.

The cycle performance and the first charge and discharge efficiency of the secondary batteries in examples 1-1 to 1-3 and comparative examples 1-1 and 1-2 were investigated. The result is given in Table 1.

The cycle performance was investigated in the following manner:

First, two cycles of charging and discharging were performed to stabilize the battery and the discharge capacity in the second cycle was measured.

Next, the cycle of charging and discharging was repeated until the total number of cycles reached 100 cycles and the discharge capacity was measured every cycle.

Finally, a capacity maintenance rate (simply referred to as a maintenance rate below) was calculated by dividing the discharge capacity in the 100-th cycle by the discharge capacity in the second cycle.

The first charge and discharge efficiency was calculated by the following expression.

Initial Efficiency (%)=(First Discharge Capacity/First Charge Capacity)×100

TABLE 1

|  | SiOx X = | Maintenance Rate % | Initial Efficiency % |
|---|---|---|---|
| Comparative Example 1-1 | 0.3 | 46 | 88.3 |
| Example 1-1 | 0.5 | 80 | 87.9 |
| Example 1-2 | 1 | 88.0 | 87.5 |
| Example 1-3 | 1.6 | 87 | 87.5 |
| Comparative Example 1-2 | 1.8 | by Gr alone | |

D50 = 4 μm, natural graphite, D50 = 20 μm, half width = 2.593, Si(111) crystallite 3.29 nm, SBR/CMC/PAA
EC:DMC(3:7 vol %) LIPF6 1.2 mol/kg, positive electrode LiCoO2, A(Si)/B(SiO2) = 2, density 5 mg/cm2
CNT1 wt %, X/Y = 5, SiO initial efficiency 80%, Li2SiO3, Li4SiO4 amorphous, lithium carbonate in surface layer, formula (1) = 3

As shown in Table 1, comparative example 1-1 (x=0.3) in which the amount of oxygen was insufficient demonstrated that the maintenance rate was significantly decreased although the initial efficiency was improved; comparative example 1-2 (x=1.8) in which the amount of oxygen was too large demonstrated that the conductivity was decreased and the capacity of the silicon oxide material was hence lower than a designed capacity. In comparative example 1-2, a carbon material (Gr) alone charged and discharged. Since a carbon material has a small logical capacity, the capacity of the battery did not increase and the evaluation was interrupted.

Examples 2-1 to 2-4 and Comparative Examples 2-1 to 2-2

A secondary battery was produced as in example 1-2 except that example 2-1 used polyvinylidene fluoride (PVDF), CMC, and PAA as the binders (negative electrode binders); example 2-2 SBR, sodium salt of CMC (CMC-Na), and PAA; example 2-3 SBR, CMC, and sodium salt of PAA (PAA-Na); example 2-4 SBR, CMC, lithium salt of PAA (PAA-Li). Comparative example 2-1 used SBR and CMC as the binders; comparative example 2-2 PVDF and CMC. In the examples using PVDF as the binders, the negative electrode active material was dried under a vacuum at 195° for 12 hours after the production of the material.

The cycle performance and the first charge and discharge efficiency of the secondary batteries in examples 2-1 to 2-4 and comparative examples 2-1 and 2-2 were investigated. The result is given in Table 2.

TABLE 2

|  | Binder | Maintenance Rate % | Initial Efficiency % |
| --- | --- | --- | --- |
| Example 2-1 | PVDF/CMC/PAA | 87.8 | 87.7 |
| Comparative Example 2-1 | SBR/CMC | 62.0 | 85.6 |
| Comparative Example 2-2 | PVDF/CMC | 70.0 | 86.8 |
| Example 2-2 | SBR/CMC-Na/PAA | 83.5 | 86.5 |
| Example 2-3 | SBR/CMC/PAA-Na | 84.6 | 86.1 |
| Example 2-4 | SBR/CMC/PAA-Li | 85.2 | 86.3 |

SiOx X = 1, D50 = 4 μm, natural graphite, D50 = 20 μm, half width = 2.593, Si(111) crystallite 3.29 nm
EC:DMC(3:7 vol %) LiPF6 1.2 mol/kg, positive electrode LiCoO2, A(Si)/B(SiO2) = 2, density 5 mg/cm2
CNT1 wt %, X/Y = 5, SiO initial efficiency 80%, Li2SiO3, Li4SiO4 amorphous, lithium carbonate in surface layer, formula (1) = 3

Comparative examples 2-1 and 2-2 demonstrated that the peel strength of the electrode was greatly decreased as compared with the examples and the cycle performance was degraded because only two materials were used as the binders and particularly no polyacrylic acid or metal salt thereof existed in the binders. The peel of the electrode was checked by the status of the applied layer or disassembling the battery after the cycles.

Comparative Example 3-1, and Examples 3-1 and 3-2

A secondary battery was produced as in example 1-2 except for the following conditions: In comparative example 3-1, the silicon active material contained no lithium carbonate coating on the surface. In example 3-1, no carbon nanotube (CNT) as a conductive additive was added. In example 3-2, the silicon active material contained none of $Li_2SiO_3$ and $Li_4SiO_4$. In comparative Example 3-1, the silicon active material was rinsed with water to remove lithium carbonate from the surface. In example 3-2, the silicon active material was calcined under a carbon atmosphere after the bulk modification to remove $Li_2SiO_3$, and the decomposed $Li_4SiO_4$, which is dissolvable in water, was removed by rinsing with pure water.

The cycle performance and the first charge and discharge efficiency of the secondary batteries in comparative example 3-1 and examples 3-1 and 3-2 were investigated. The results are each given in Tables 3-1, 3-2, and 3-3.

TABLE 3-1

|  | Lithium Carbonate | Maintenance Rate % | Initial Efficiency % |
| --- | --- | --- | --- |
| Example 1-2 | Present | 88.0 | 87.5 |
| Comparative Example 3-1 | None | 84.1 | 73.0 |

SiOx X = 1, D50 = 4 μm, natural graphite, D50 = 20 μm, half width = 2.593, Si(111) crystallite 3.29 nm
EC:DMC(3:7 vol %) LiPF6 1.2 mol/kg, positive electrode LiCoO2, A(Si)/B(SiO2) = 2, density 5 mg/cm2
CNT1 wt %, X/Y = 5, SiO initial efficiency 80%, Li2SiO3, Li4SiO4 amorphous, SBR/CMC/PAA, formula (1) = 3

As shown in Table 3-1, comparative example 3-1 demonstrated that the initial efficiency was decreased due to an increase in charge capacity because the silicon active material contained no lithium carbonate on the surface; the maintenance rate was decreased because of lack of a stable coating on the surface.

TABLE 3-2

|  | CNT | Maintenance Rate % | Initial Efficiency % |
| --- | --- | --- | --- |
| Example 1-2 | 1 wt % | 88.0 | 87.5 |
| Example 3-1 | None | 82.0 | 87.9 |

SiOx X = 1, D50 = 4 μm, natural graphite, D50 = 20 μm, half width = 2.593, Si(111) crystallite 3.29 nm
EC:DMC(3:7 vol %) LiPF6 1.2 mol/kg, positive electrode LiCoO2, A(Si)/B(SiO2) = 2, density 5 mg/cm2
Li2CO3 in surface layer, X/Y = 5, SiO initial efficiency 80%, Li2SiO3, Li4SiO4 amorphous, SBR/CMC/PAA, formula (1) = 3

Table 3-2 shows that adding CNT improves both the maintenance rate and the initial efficiency. It was revealed that the added CNT in the negative electrode electrically contacts the silicon active material (the SiO material) with the carbon active material and thereby improves the battery performances.

TABLE 3-3

|  | Li4SiO4, Li2SiO3 | Maintenance Rate % | Initial Efficiency % |
| --- | --- | --- | --- |
| Example 1-2 | Present | 88.0 | 87.5 |
| Example 3-2 | None | 80.0 | 83.0 |

SiOx X = 1, D50 = 4 μm, natural graphite, D50 = 20 μm, half width = 2.593, Si(111) crystallite 3.29 nm
EC:DMC(3:7 vol %) LiPF6 1.2 mol/kg, positive electrode LiCoO2, A(Si)/B(SiO2) = 2, density 5 mg/cm2
Li2CO3 in surface layer, X/Y = 5, SiO initial efficiency 80%, CNT1 wt %, SBR/CMC/PAA, formula (1) = 3

Table 3-3 shows that the silicon active material containing $Li_2SiO_3$ and $Li_4SiO_4$ improves the maintenance rate and the initial efficiency.

Examples 4-1 to 4-6

A secondary battery was produced as in example except that the mass ratio C/P of the mass C of the carboxymethyl cellulose and the mass P of the polyacrylic acid was changed as shown in Table 4.

TABLE 4

|           | C/P  | Maintenance Rate % | Initial Efficiency % |
|-----------|------|--------------------|----------------------|
| Example 1-2 | 3    | 88.0               | 87.5                 |
| Example 4-1 | 6    | 80                 | 85.0                 |
| Example 4-2 | 5    | 86                 | 87.4                 |
| Example 4-3 | 1    | 85                 | 87.6                 |
| Example 4-4 | 0.5  | 82                 | 87.6                 |
| Example 4-5 | 0.25 | 80.0               | 85.6                 |
| Example 4-6 | 0.15 | 71.0               | 80.0                 |

SiOx X = 1, D50 = 4 μm, natural graphite, D50 = 20 μm, half width = 2.593, Si(111) crystallite 3.29 nm
EC:DMC(3:7 vol %) LIPF6 1.2 mol/kg, positive electrode LiCoO2, A(Si)/B(SiO2) = 2, density 5 mg/cm2
CNT1 wt %, X/Y = 5, SiO initial efficiency 80%, Li2SiO3, Li4SiO4 amorphous, SBR/CMC/PAA, lithium carbonate in surface layer As shown in Table 4, the satisfaction of 5≥C/P≥0.25 (formula (1)) prevents the CMC-to-PAA ratio from becoming too large and hence the electrode from being rigid, thereby making the negative electrode active material layer hard to peel. These effects further improve the maintenance rate and the initial efficiency (in examples 1-2, and 4-2 to 4-5). In this way, it was revealed that a proper mixing ratio (mass ratio) exits in the combination of CMC and PAA.

Examples 5-1 to 5-3

A secondary battery was produced as in example 1-2 except that the amount (the area density) per unit area of the negative electrode active material layer on one side in the negative electrode was changed as shown in Table 5.

TABLE 5

|           | Area Density mg/cm2 | Maintenance Rate % | Initial Efficiency % |
|-----------|---------------------|--------------------|----------------------|
| Example 1-2 | 5                 | 88.0               | 87.5                 |
| Example 5-1 | 6.5               | 88.0               | 87.4                 |
| Example 5-2 | 8.5               | 84.0               | 87.1                 |
| Example 5-3 | 9.5               | 71.0               | 81.0                 |

SiOx X = 1, D50 = 4 μm, natural graphite, D50 = 20 μm, half width = 2.593, Si(111) crystallite 3.29 nm
EC:DMC(3:7 vol %) LIPF6 1.2 mol/kg, positive electrode LiCoO2, A(Si)/B(SiO2) = 2, formula (1) = 3
CNT1 wt %, X/Y = 5, SiO initial efficiency 80%, Li2SiO3, Li4SiO4 amorphous, SBR/CMC/PAA, lithium carbonate in surface layer Table 5 shows that the negative electrode, in which the amount of the negative electrode active material layer on one side is equal to or less than 8.5 mg/cm$^2$ per unit area, improves the maintenance rate and the initial efficiency (in examples 1-2, 5-1, and 5-2). It was thus revealed that the inventive negative electrode, in which even a hard material such as polyacrylic acid is used as a binder, can be inhibited from peeling and improve the battery performances.

Examples 6-1 to 6-4

A secondary battery was produced as in example 1-2 except that the carbon active material in the negative electrode active material was changed as shown in Table 6.

TABLE 6

|           | C | Maintenance Rate % | Initial Efficiency % |
|-----------|---|--------------------|----------------------|
| Example 1-2 | Natural Graphite | 88.0 | 87.5 |
| Example 6-1 | Natural Graphite: Synthetic Graphite | 90.0 | 88.3 |

TABLE 6-continued

|           | C | Maintenance Rate % | Initial Efficiency % |
|-----------|---|--------------------|----------------------|
| Example 6-2 | Natural Graphite: Hard Carbon | 89.6 | 85.0 |
| Example 6-3 | Natural Graphite: Soft Carbon | 87.3 | 85.2 |
| Example 6-4 | Natural Graphite: Hard Carbon: Synthetic Graphite | 88.1 | 85.9 |

SiOx X = 1, D50 = 4 nm, graphite, D50 = 20 μm, half width = 2.593, Si(111) crystallite 3.29 nm
EC:DMC(3:7 vol %) LIPF6 1.2 mol/kg, positive electrode LiCoO2, A(Si)/B(SiO2) = 2, formula (1) = 3, density 5 mg/cm2
CNT1 wt %, X/Y = 5, SiO initial efficiency 80%, Li2SiO3, Li4SiO4 amorphous, SBR/CMC/PAA, lithium carbonate in surface layer As shown in Table 6, it was revealed that adding synthetic graphite or hard carbon into natural carbon further improves the battery performances.

It was also revealed that all carbon combinations unproblematically exhibit good battery performances depending on battery design such as a discharging curve.

Examples 7-1 to 7-5

A secondary battery was produced as in example 1-2 except that the median diameter ratio X/Y of the carbon active material to the silicon active material was changed as shown in Table 7.

TABLE 7

|           | X/Y | Maintenance Rate % | Initial Efficiency % |
|-----------|-----|--------------------|----------------------|
| Example 1-2 | 20 | 88.0 | 87.5 |
| Example 7-1 | 16 | 88.1 | 86.1 |
| Example 7-2 | 12 | 88.0 | 85.8 |
| Example 7-3 | 8  | 87.6 | 84.2 |
| Example 7-4 | 4  | 87.0 | 83.6 |
| Example 7-5 | 2  | 79.8 | 82.9 |

SiOx X = 1, D50 = 4 μm, graphite, D50 = 20 μm, half width = 2.593, Si(111) crystallite 3.29 nm
EC:DMC(3:7 vol %) LIPF6 1.2 mol/kg, positive electrode LiCoO2, A(Si)/B(SiO2) = 2, formula (1) = 3, density 5 mg/cm2
CNT1 wt %, SiO initial efficiency 80%, Li2SiO3, Li4SiO4 amorphous, SBR/CMC/PAA, lithium carbonate in surface layer As shown in Table 7, the carbon active material in the negative electrode active material layer preferably has a size equal or more than that of the silicon active material. The negative electrode, including the expandable and shrinkable silicon active material having a size equal to or less than that of the carbon active material, enables the layer using these materials to be prevented from breaking. The negative electrode, including the carbon active material having a larger size than that of the silicon active material, also enables improvement in negative electrode volume density at charging, negative electrode initial efficiency, and battery energy density.

Examples 8-1 to 8-5

A secondary battery was produced as in example 1-2 except that the component of Si/SiO$_2$ created in the bulk was changed to vary the initial efficiency of SiO itself, and the ratio A/B was changed as shown in FIG. 8, where A was the peak intensity of an Si region represented by a chemical shift value of −60 ppm to −100 ppm, B was the peak intensity of an SiO$_2$ region represented by a chemical shift value of −100 ppm to −150 ppm, and the chemical shift value was obtained from a $^{29}$Si-MAS-NMR spectrum. This can be controlled by regulating electric potential when the $SiO_2$ region was doped with lithium by the electrochemical lithium doping method.

TABLE 8

|  | A/B | Maintenance Rate % | Initial Efficiency % |
|---|---|---|---|
| Example 8-1 | 0.4 | 85.0 | 83.0 |
| Example 8-2 | 0.8 | 86 | 84.4 |
| Example 8-3 | 1 | 87.5 | 85.3 |
| Example 8-4 | 2.5 | 89.5 | 87.7 |
| Example 8-5 | 3 | 90 | 88.1 |
| Example 1-2 | 2 | 88.0 | 87.5 |

SiOx X = 1, D50 = 4 μm, graphite, D50 = 20 μm, half width = 2.593, Si(111) crystallite 3.29 nm
EC:DMC(3:7 vol %) LiPF6 1.2 mol/kg, positive electrode LiCoO2, formula (1) = 3, density 5 mg/cm2, X/Y = 5
CNT1 wt %, SiO initial efficiency 80%, Li2SiO3, Li4SiO4 amorphous, SBR/CMC/PAA, lithium carbonate in surface layer Table 8 shows that when the ratio A/B became 0.8 or more, i.e., the peak intensity B of the $SiO_2$ region, represented by a chemical shift value obtained from the $^{29}Si$-MAS-NMR spectrum, became smaller, higher battery performances were obtained. It was thus revealed that previous reduction in the $SiO_2$ region, which is a lithium reacting site, improves the initial efficiency, and a stable lithium compound in the bulk enables the inhabitation of the deterioration of the battery due to charging and discharging.

Examples 9-1 to 9-6

A secondary battery was produced as in example 1-2 except that the crystallinity of lithium silicate compounds ($Li_2SiO_3$ and $Li_4SiO_4$) created in the bulk of the silicon active material was changed. The crystallinity can be adjusted by performing a heat treatment under a non-atmospheric condition after the insertion and extraction of lithium.

TABLE 9

|  | Li2SiO3 crystallinity | Li4SiO4 crystallinity | Maintenance Rate % |
|---|---|---|---|
| Example 9-1 | Amorphous | 0.15° | 82.5 |
| Example 9-2 | Amorphous | 0.2° | 85.5 |
| Example 9-3 | Amorphous | 1° | 87.5 |
| Example 9-4 | 0.4° | Amorphous | 81.5 |
| Example 9-5 | 0.75° | Amorphous | 85.5 |
| Example 9-6 | 1° | Amorphous | 87.5 |
| Example 1-2 | Amorphous | Amorphous | 88.0 |

SiOx X = 1, D50 = 4 μm, graphite, D50 = 20 μm, half width = 2.593, Si(111) crystallite 3.29 nm, A/B = 2
EC:DMC(3:7 vol %) LiPF6 1.2 mol/kg, positive electrode LiCoO2, formula (1) = 3, density 5 mg/cm2, X/Y = 5
CNT1 wt %, SiO initial efficiency 80%, SBR/CMC/PAA, lithium carbonate in surface layer It was seen that lower crystallinity of the lithium silicate compounds effects further improvement in the maintenance rate. The reason is considered that lower crystallinity decreases resistance in the active material.

Examples 10-1 to 10-9

A secondary battery was produced as in example 1-2 except that the crystallinity of the silicon active material was changed. The crystallinity can be adjusted by performing a heat treatment under a non-atmospheric condition after the insertion and extraction of lithium. Table 10 shows the half width 2θ(°) of the diffraction peak attributable to an Si(111) crystal face and obtainable by X-ray diffraction performed on the silicon active material in examples 10-1 to 10-9. Although Example 10-9 exhibits a half width more than 20°, this value was obtained by fitting with analysis software because the peak value was not obtained. The silicon active material in examples 10-9 was substantially amorphous.

TABLE 10

|  | Half Width 2θ | Si(111) Crystallite Size nm | Maintenance Rate % |
|---|---|---|---|
| Example 10-1 | 0.756 | 11.42 | 80.2 |
| Example 10-2 | 0.796 | 10.84 | 81.2 |
| Example 10-3 | 1.025 | 8.55 | 82.2 |
| Example 10-4 | 1.218 | 7.21 | 85.2 |
| Example 10-5 | 1.271 | 6.63 | 86.2 |
| Example 10-6 | 1.845 | 4.62 | 87.2 |
| Example 10-7 | 2.257 | 3.77 | 87.7 |
| Example 1-2 | 2.593 | 3.29 | 88.0 |
| Example 10-8 | 10.123 | 1.524 | 89.2 |
| Example 10-9 | 20.221 | 0 | 90.2 |

SiOx X = 1, D50 = 4 μm, graphite, D50 = 20 μm, A/B = 2
EC:DMC(3:7 vol %) LiPF6 1.2 mol/kg, positive electrode LiCoO2, formula (1) = 3, density 5 mg/cm2, X/Y = 5
CNT1 wt %, SiO initial efficiency 80%, SBR/CMC/PAA, lithium carbonate in surface layer, Li2SiO3, Li4SiO4 amorphous The low crystallinity materials having a half width (2θ) of 1.2° or more and a crystallite size of 7.5 nm or less, which is attributable to the Si(111) crystal face, particularly contributed to a higher maintenance rate and initial efficiency. In particular, the best battery performances were obtained in the amorphous region in example 10-9.

Example 11 and Comparative Example 11

A secondary battery was produced as in example 1-2 to investigate the increasing rate of the battery capacity except that conditions were changed as follows: example 11 changed the ratio of the silicon active material to the total amount of the negative electrode active materials in the range from 0 mass % to 20 mass %; comparative example 11 used negative electrode active materials composed of carbon active material and silicon active material having no lithium carbonate on the surface without the bulk modification and, as in example 11, changed the ratio of the silicon active material to the total amount of the negative electrode active materials in the range from 0 mass % to 20 mass %.

Figure 4:
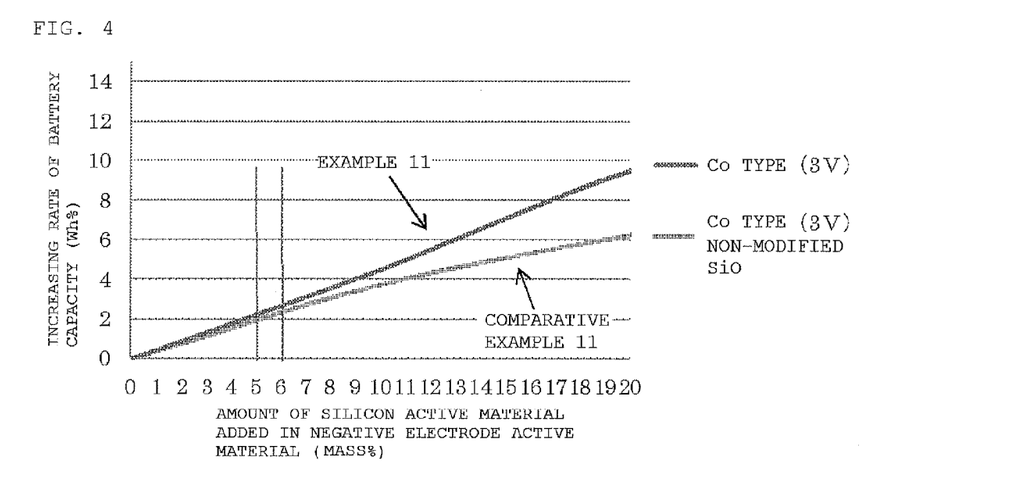
FIG. 4 is a graph of an increasing rate of battery capacity with an increase in the ratio of silicon active material among negative electrode active materials in example 11 and comparative example 11.

The result is shown in FIG. 4. As shown in FIG. 4, the curves indicate that the increasing rate of the battery capacity in example 11 greatly increased as compared with comparative example 11 when the ratio of the silicon active material was 6 weight % or more; and the higher the ratio of the silicon active material is, the larger the difference is. This result revealed that the present invention can increase the increasing rate of the battery capacity as compared with previously by increasing the ratio of the silicon active material in the negative electrode active materials to 6 weight % or more, and thus greatly increase the battery capacity.

It is to be noted that the present invention is not restricted to the foregoing embodiment. The embodiment is just an exemplification, and any examples that have substantially the same feature and demonstrate the same functions and effects as those in the technical concept described in claims of the present invention are included in the technical scope of the present invention.

What is claimed is:

1. A negative electrode for a non-aqueous electrolyte secondary battery, the negative electrode comprising a negative electrode active material layer containing:

negative electrode active materials including carbon active material and silicon active material composed of $SiO_x$ at least partially coated with lithium carbonate where $0.5 \leq x \leq 1.6$; and binders including carboxymethyl cellulose or metal salt thereof; polyacrylic acid or metal salt thereof; and styrene-butadiene rubber or polyvinylidene fluoride, wherein the silicon active material contains at least one of $Li_2SiO_3$ and $Li_4SiO_4$ in an interior, the $Li_2SiO_3$ exhibits a diffraction peak having a half width (2θ) of 0.75° or more, the diffraction peak being observed at around 38.2680° when X-ray diffraction is performed on the silicon active material, and the $Li_4SiO_4$ exhibits a diffraction peak having a half width (2θ) of 0.2° or more, the diffraction peak being observed at around 23.9661° when X-ray diffraction is performed on the silicon active material.

2. The negative electrode for a non-aqueous electrolyte secondary battery according to claim 1, wherein a mass ratio of the silicon active material to the total amount of the negative electrode active materials is 6 mass % or more.

3. The negative electrode for a non-aqueous electrolyte secondary battery according to claim 1, wherein the silicon active material contains at least $Li_4SiO_4$ in the interior.

4. The negative electrode for a non-aqueous electrolyte secondary battery according to claim 1, wherein the silicon active material contains at least $Li_2SiO_3$ in the interior.

5. The negative electrode for a non-aqueous electrolyte secondary battery according to claim 1, wherein $Li_2SiO_3$ and $Li_4SiO_4$ contained in the silicon active material are amorphous.

6. The negative electrode for a non-aqueous electrolyte secondary battery according claim 1, wherein a mass ratio C/P satisfies the following formula (1), $$5 \geq C/P \geq 0.25 \qquad (1)$$

where C is mass of the carboxymethyl cellulose or metal salt thereof and P is mass of the polyacrylic acid or metal salt thereof.

7. The negative electrode for a non-aqueous electrolyte secondary battery according to claim 1, wherein an amount of the negative electrode active material layer on one side is equal to or less than 8.5 mg/cm² per unit area.

8. The negative electrode for a non-aqueous electrolyte secondary battery according to claim 1, further comprising a carbon nanotube.

9. The negative electrode for a non-aqueous electrolyte secondary battery according to claim 1, wherein the carbon active material contains natural graphite, and a mass ratio of the natural graphite to the total amount of the carbon active material ranges from 30 mass % to 80 mass %.

10. The negative electrode for a non-aqueous electrolyte secondary battery according to claim 1, wherein the carbon active material contains at least two materials selected from the group consisting of natural graphite, synthetic graphite, hard carbon, and soft carbon.

11. The negative electrode for a non-aqueous electrolyte secondary battery according to claim 1, wherein the negative electrode satisfies X/Y≥1 where X is a median diameter of the carbon active material and Y is a median diameter of the silicon active material.

12. The negative electrode for a non-aqueous electrolyte secondary battery according to claim 1, wherein the silicon active material satisfies A/B≥0.8 where A is a peak intensity of an Si region represented by a chemical shift value of −60 ppm to −100 ppm, and B is a peak intensity of an $SiO_2$ region represented by a chemical shift value of −100 ppm to −150 ppm, the chemical shift value being obtained from a $^{29}Si$-Magic Angle Spinning (MAS)-Nuclear Magnetic Resonance (NMR) spectrum.

13. The negative electrode for a non-aqueous electrolyte secondary battery according to claim 1, wherein the silicon active material exhibits a diffraction peak having a half width (2θ) of 1.2° or more, the diffraction peak being attributable to an Si(111) crystal face and obtained when X-ray diffraction is performed on the silicon active material, and a crystallite size attributable to the crystal face is 7.5 nm or less.

14. A non-aqueous electrolyte secondary battery comprising a negative electrode according to claim 1.

* * * * *